US007467244B2

(12) United States Patent
Kamphausen et al.

(10) Patent No.: US 7,467,244 B2
(45) Date of Patent: Dec. 16, 2008

(54) CONNECTING A COMPUTER PROGRAM AND A PERIPHERAL DEVICE USING A FIRST COMMUNICATION PROTOCOL THROUGH AN INTERCONNECT USING A SECOND COMMUNICATION PROTOCOL

(75) Inventors: Ralf Kamphausen, Vordorf (DE); Martin Zemke, Lengede (DE); Soenke E. W. Brandt, Braunschweig (DE)

(73) Assignee: Avid Technology, Inc., Tewksbury, MA (US)

( * ) Notice: Subject to any disclaimer, the term of this patent is extended or adjusted under 35 U.S.C. 154(b) by 122 days.

(21) Appl. No.: 10/803,330

(22) Filed: Mar. 17, 2004

(65) Prior Publication Data

US 2005/0210167 A1  Sep. 22, 2005

(51) Int. Cl.
*G06F 13/12* (2006.01)
*G06F 3/00* (2006.01)
(52) U.S. Cl. .............................. 710/65; 710/8; 710/62; 710/72
(58) Field of Classification Search ..................... 710/2, 710/62, 65, 72, 5, 70
See application file for complete search history.

(56) References Cited

U.S. PATENT DOCUMENTS

2001/0047441 A1  11/2001  Robertson
2001/0047475 A1*  11/2001  Terasaki ..................... 713/160
2002/0141418 A1  10/2002  Ben-Dor et al.
2003/0106067 A1  6/2003  Hoskins et al.

FOREIGN PATENT DOCUMENTS

| DE | 203 10 488 U 1 | 10/2003 |
| GB | 1383314 | 1/2004 |
| JP | 2004015181 | 1/2004 |

OTHER PUBLICATIONS

Machine Translation for Fujimori, JP2004015181, Jan. 15, 2004, JPO, pp. 1-4.*
"Universal Serial Bus Specification," USB-Implementers Forum, Inc., Revision 2.0, Apr. 27, 2000, XP-002330584, pp. 25-84 and pp. 195-238.
Mikawa, Masahiko, A Programming Interface for IEEE 1394 Video Device In Robot Vision, SICE Annual Conference in Fukui, Fukui University, Japan, Aug. 4-6, 2003, pp. 766-771.
EPC Communication in EP Application No. 05 725 706.5-22-6, dated Feb. 14, 2008, 10 pages.

* cited by examiner

*Primary Examiner*—Alan S. Chen
(74) *Attorney, Agent, or Firm*—Oliver Strimpel; Peter J. Gordon (57) ABSTRACT

A device and method for electronic data conversion is provided. Data according to IEEE 1394 format and protocol is received and converted to USB format and protocol and supplied to a system configured to receive data according to USB format and protocol.

6 Claims, 4 Drawing Sheets

CONNECTING A COMPUTER PROGRAM AND A PERIPHERAL DEVICE USING A FIRST COMMUNICATION PROTOCOL THROUGH AN INTERCONNECT USING A SECOND COMMUNICATION PROTOCOL

FIELD

The present application relates to a device and method for electronic data conversion.

INTRODUCTION

Data transmission between devices constitutes an important aspect of electronic communications. The efficient and reliable exchange of information between devices enables the processing of data to achieve useful results. For example, a computer system can exchange data between a printer and vice versa for the purpose of printing a hardcopy of what is represented in the computer system. Other forms of data transmission include, but are not limited to, status identifiers, system checks, interrupt signals, and/or command signals. Each form of data transmission accomplishes certain tasks with the goal of implementing efficient and reliable data exchange between various devices.

Various data transmission protocols have been developed to enable the efficient and reliable exchange of data between various devices, including, but not limited to, systems and/or peripherals. Typically, each protocol explains in detail the hardware specifications to implement the protocol as well as, for example, how data is packaged and sent using the specified hardware. For example, one common protocol is the Universal Serial Bus ("USB") protocol which is described in more detail in the Universal Serial Bus Specification Revision 2.0, dated Apr. 27, 2000. Another example of a common protocol is the Institute of Electrical and Electronics Engineers ("IEEE") 1394 protocol which is described in more detail in the following IEEE 1394 standards: IEEE Std 1394-1995 and IEEE Std 1394a-2000).

Unfortunately, few data transmission protocols interact seamlessly with other, different protocols. Thus, for example, data sent along a USB-compliant connection cannot ordinarily continue on along an IEEE 1394-compliant connection. This presents a problem since many systems support one type of protocol but not another. For example, personal computers ("PCs") typically support a variant of the USB protocol, but fewer PCs support the IEEE 1394 protocol. Thus, certain peripherals and/or systems that support only the IEEE 1394 protocol, for example, many camcorders, cannot directly send data to USB-only PCs. One possible solution to enable communication between such devices directly would be to obtain and install an IEEE 1394 controller in a PC. However, adding an IEEE 1394 controller to a PC adds to the expense of the computer system and introduces possible compatibility issues.

Accordingly, it is desirable to have a method and apparatus that can allow certain systems containing USB interfaces to interact with certain devices containing IEEE 1394 interfaces.

SUMMARY

According to certain embodiments consistent with the invention, there is provided a converting device comprising an IEEE 1394 interface for processing data in IEEE 1394 format by at least one of receiving and transmitting, and a USB interface for processing data in USB format by at least one of receiving and transmitting. The device further comprises processing logic coupled to the IEEE 1394 and USB interfaces to convert data between IEEE 1394 protocol and USB protocol.

According to other embodiments consistent with the invention, there is provided a method for exchanging data between a video application, executing in a computer system, and a digital video device. The method comprises generating an IEEE 1394 command to exchange data with a digital video device, the IEEE 1394 command being generated in the application according to IEEE 1394 protocol, and converting the IEEE 1394 command to a USB command in accordance with the USB protocol. The method additionally comprises transmitting the USB command over a USB connection external to the computer system, receiving the USB command in a converter device, converting the USB command to the IEEE 1394 command, and transmitting the IEEE 1394 command to the digital video device.

DETAILED DESCRIPTION

In this application, the use of the singular includes the plural unless specifically stated otherwise. In this application, the use of "or" means "and/or" unless stated otherwise. Furthermore, the use of the term "including," as well as other forms, such as "includes" and "included," is not limiting. Wherever possible, the same reference numbers will be used throughout the drawings to refer to the same or like parts.

The section headings used herein are for organizational purposes only, and are not to be construed as limiting the subject matter described. All documents cited in this application, including, but not limited to, patents, patent applications, articles, books, and treatises, are expressly incorporated by reference in their entirety for any purpose.

The term "IEEE 1394" as used herein refers to the protocol for data communications and interconnection established by the Institute of Electrical and Electronics Engineers ("IEEE") 1394 specification. See, for example, the IEEE 1394 standards IEEE Std 1394-1995 and IEEE Std 1394a-2000. It is intended that this term includes all variants, revisions, and future developments of this protocol, including, but not limited to, IEEE 1394a (i.e., 400 Mbit/s), IEEE 1394b (i.e., 800 Mbit/s), and the not yet completed wireless IEEE 1394 implementation. It is also intended that this term includes the data format (e.g., description, packaging, delivery, and/or any headers to the same) as well as the hardware connection specification contained within the IEEE 1394 specification.

The term "USB" as used herein refers to the Universal Serial Bus protocol for data communications and interconnection. See, for example, the Universal Serial Bus Specification Revision 2.0 dated Apr. 27, 2000. It is intended that this term includes all variants, revisions, and future developments of this protocol, including, but not limited to, USB 1.x, USB 2.x, and any wireless (e.g., infrared, radio frequency, etc.) version. It is also intended that this term includes the data format (e.g., description, packaging, delivery, and/or any headers to the same) as well as the hardware connection specification contained within the USB protocol.

The term "system" or "computer system" as used herein refers to an arbitrary hardware collection on which controlling software can operate. In certain embodiments, the system can include computers and/or set-top boxes. In certain embodiments, the system can include at least one USB interface.

The term "IEEE 1394 device" as used herein refers to one or more hardware devices that can transmit data in compliance with IEEE 1394. In certain embodiments, each IEEE 1394 device can contain at least one IEEE 1394 hardware interface. In certain embodiments, each IEEE 1394 device can include analog and/or digital camcorders.

The term "data" as used herein refers to information in electronic form and is meant to encompass both data units and data packets.

The term "data units" as used herein refers to an arbitrary collection of bits of electronic information.

The term "data packet" as used herein refers to an arbitrary collection of data units. In certain embodiments, a data packet can include an optional header. For example, the optional header can facilitate conversion of data units so that they may be used by disparate data transmission protocols.

The term "transfer" as used herein refers to the sending and/or receiving of data.

The term "logical units" as used herein refers to processing logic to carry out logical operations on data. Non-limiting examples include software and/or hardware that may be on one chip or on multiple chips.

The term "device" as used herein refers to any peripheral, system, and/or component that can transmit and/or receive electronic data.

The term "application" as used herein refers to one or more software programs that run on the system and that directly or indirectly access an IEEE 1394 device. In certain embodiments, the application can directly access an IEEE 1394 device by sending and/or receiving electronic data with the IEEE 1394 device without an intermediate step involved. In certain embodiments, the application can indirectly access an IEEE 1394 device by data transmission through an intermediate step, such as, for example, usage of another software program on the system and/or storage of certain data in an intermediate location to be used by application at a later time.

The term "convert" (and variants thereof) as used herein refers to transformation of data from one data transmission protocol (e.g., IEEE 1394 and/or USB) to another data transmission protocol. This definition expressly includes, but is not limited to, any modification, translation, and/or encapsulation (or combinations thereof) of data into (or within) a data transmission protocol.

Figure 1:
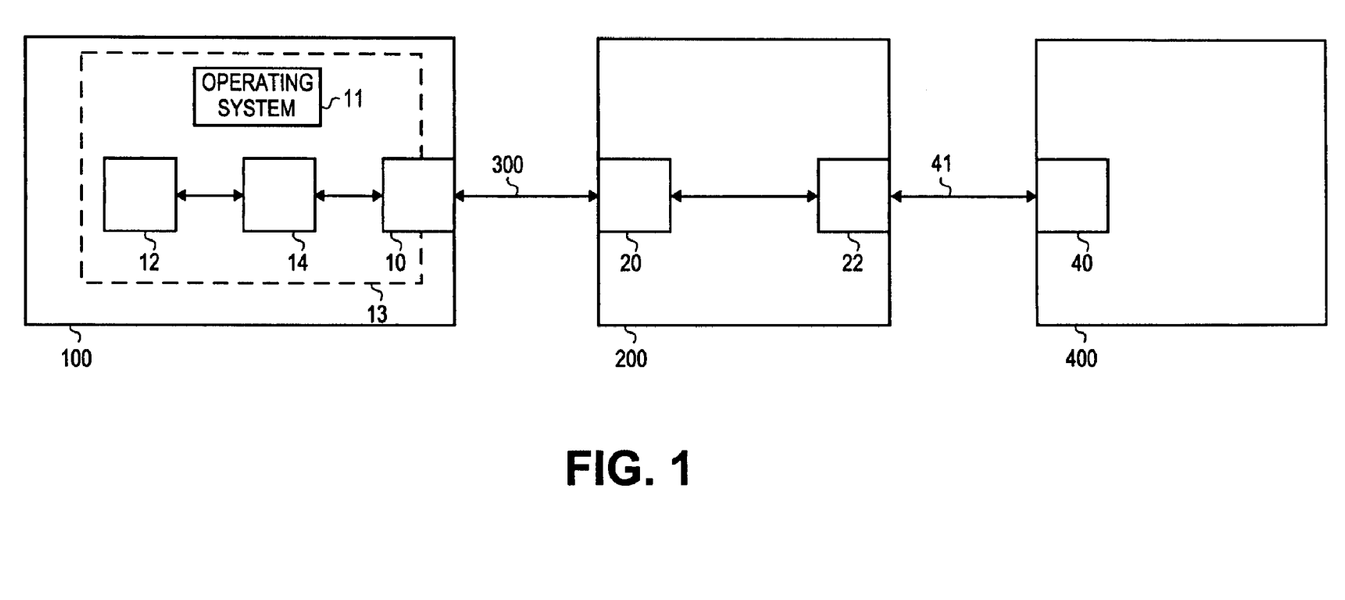
FIG. 1 illustrates an exemplary diagram of a system connected to a converter.

According to certain embodiments, as illustrated in FIG. 1, a system 100 may comprise a personal computer and may connect to a converter 200 through at least one USB interface to allow system 100 to access data units from one or more IEEE 1394 devices 400. System 100 can also include at least one system USB interface 10 that can connect with a converter USB interface 20 on converter 200 through a USB connection 300. An non-limiting example of USB connection 300 can be any cable that attaches to system USB interface 10 and/or converter USB interface 20 that complies with the USB protocol. In another non-limiting example, USB connection 300 can connect system USB interface 10 to converter USB interface 20 directly, for example, without the use of a cable. Converter 200 can be physically located external to system 100. However, converter 200 can also be physically located within system 100.

According to certain embodiments, one or more IEEE 1394 devices 400 can connect to a converter IEEE 1394 interface 22 on converter 200. For example, IEEE 1394 device 400 can generate data that can be output through a device IEEE 1394 interface 40. This data can then be routed to converter IEEE 1394 interface 22 through an appropriate IEEE 1394 connection 41 such as, for example, an IEEE 1394-compliant cable that can be connected to IEEE 1394 device 400. Converter IEEE 1394 interface 22 may include a plurality of registers that can store data for later retrieval.

According to certain embodiments, system 100 can include an operating system 11, such as Microsoft™ Windows XP™, an application 12, and a system memory 13. Application 12 can comprise software running on system 100 that utilizes data units received from IEEE 1394 device 400. For example, application 12 can be a video editing software package, such as Pinnacle Systems Studio, Pinnacle Systems Liquid Edition, sold by Pinnacle Systems of Santa Clara, Calif., that processes data generated by, for example, a video camera. Application 12 can access IEEE 1394 device 400 directly, for example, without any intermediate operations performed on the data units sent between application 12 and IEEE 1394 device 400, except for the data conversion carried out in converter 200. In contrast, application 12 can access IEEE 1394 device 400 indirectly, for example, by sending data units to an intermediate location that processes and/or stores the data units for later transmittal between IEEE 1394 device 400 and application 12. Application 12 can also utilize data from IEEE 1394 device 400 in a transparent manner. For example, application 12 can receive data from IEEE 1394 device without application 12 "knowing" of the existence of converter 200.

According to certain embodiments, system 100 can include a driver 14. Driver 14 can comprise software that controls the bi-directional and/or unidirectional data transfer between system 100 and converter 200. Driver 14 can also control the bidirectional or unidirectional data transfer between IEEE 1394 device 400 and converter 200. For example, driver 14 can receive process status messages from various components, including, but not limited to, a controller 24 in converter 200 (see, for example, FIG. 2). Driver 14 can also control the data conversion process in converter 200. For example, driver 14 can send data units in the form of commands to converter 200 to instruct converter 200 to facilitate the flow, storage and/or packaging of data units as the data units progress between converter IEEE 1394 interface 22 and converter USB interface 20. In another example, driver 14 can send data units in the form of commands to converter 200 to instruct converter 200 to facilitate the transmission of data units between converter USB interface 20 and system USB interface 10, which may comprise a standard USB socket. In addition, driver 14 can, for example, send data units in the form of commands to IEEE 1394 device 400 to facilitate the transmission of data units between the converter IEEE 1394 interface 22 and device IEEE 1394 interface 40. Any combination of these previous examples can occur (i.e., they are not meant to be mutually exclusive of one another.) Driver 14 can also provide, directly or indirectly, a software interface to application 12. The software interface can, for example, allow application 12 to perform one or more of driver's 14 functions.

Figure 2:
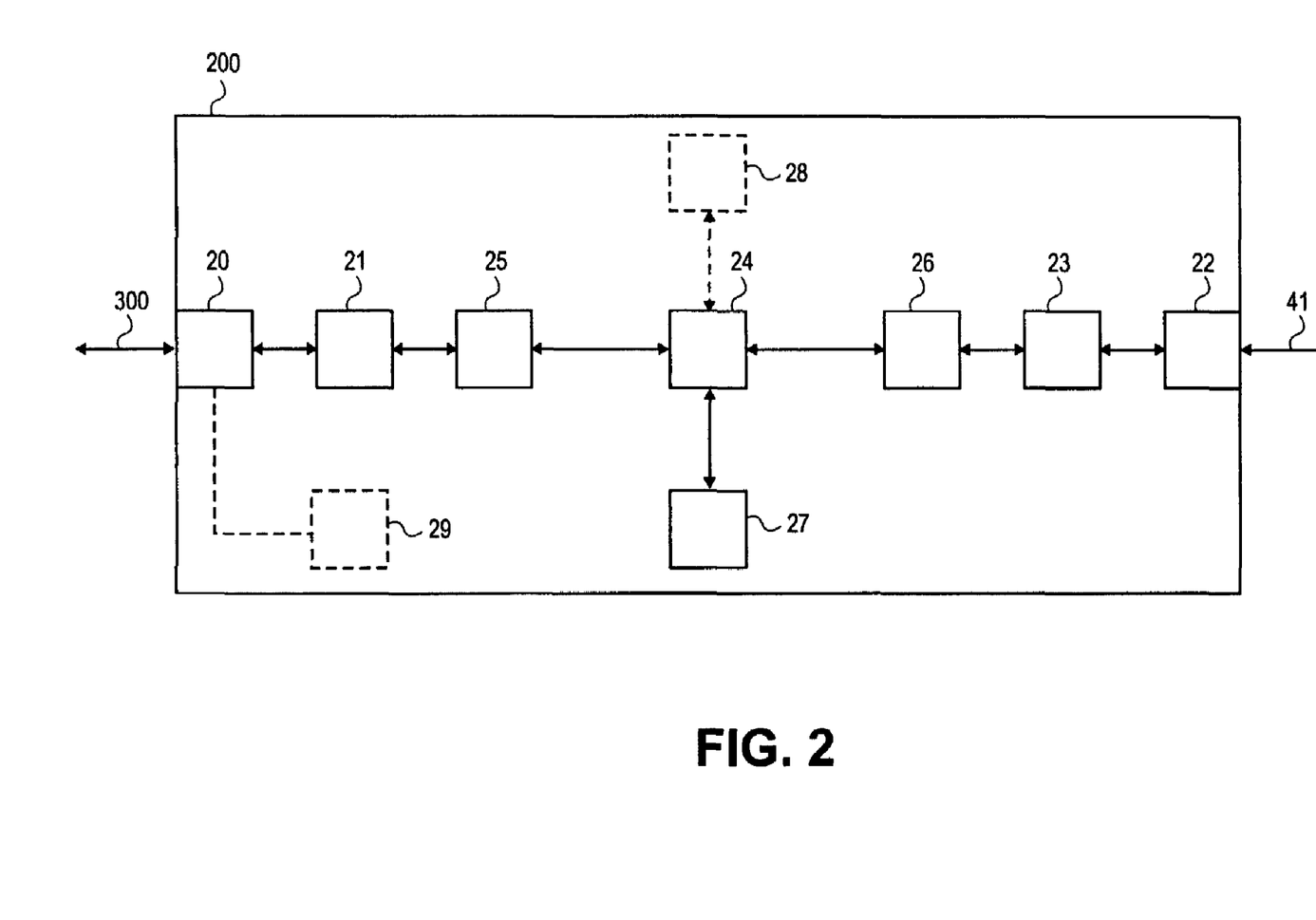
FIG. 2 illustrates an exemplary diagram of a converter.

In certain embodiments, converter 200 can implement bi-directional data conversion between converter IEEE 1394 interface 22 and converter USB interface 20. In addition, converter 200 can implement the conversion of the electrical properties (e.g., electrical power to run the corresponding component and/or device) between converter IEEE 1394 interface 22 and converter USB interface 20.

In certain embodiments, converter 200 can include a plurality of logical units including, but not limited to, a protocol translation unit, a buffer, a memory unit, and/or a controller. The totality of logical units, which may be referred to as processing logic, can facilitate data conversion between converter IEEE interface 22 and converter USB interface 20, in either or both directions. Each logical unit, or a combination of thereof, can be implemented in various ways. For example, one or more of these logical units can be part of a single and/or multiple hardware chip implementation(s). In another example, one or more of these logical units can be part of a discrete hardware implementation. Also, for example, one or more of these logical units can be part of a software implementation. These non-limiting examples are not necessarily mutually exclusive, and a particular implementation of logical units can include various combinations of each example.

According to certain embodiments, as illustrated in FIG. 2, converter 200 can include protocol translation units ("PTU") 21, 23. Each PTU can facilitate modification and/or conversion of certain data so that the data can conform to different bus protocols, including, but not limited to, IEEE 1394-compliant protocols, USB-compliant protocols, and any internal translation protocols. Conversion of data between different protocols is meant to include translation and/or encapsulation of the data for transmission on the various different protocols. For example, conversion between USB-compliant data and IEEE 1394-compliant data includes both translation of certain data, manipulation of that data (e.g., to include optional headers), and encapsulation of certain data within a different bus protocol.

According to certain embodiments, as illustrated in FIG. 2, converter 200 can include at least one controller 24. Controller 24 can facilitate, in either or both directions, the transfer of data units between converter IEEE 1394 interface 22 and converter USB interface 20. For example, controller 24 can exchange commands, data units, and/or status information with driver 14 through components that connect, directly or indirectly, controller 24 to driver 14. For example, components that connect controller 24 to driver 14 can comprise converter USB interface 20, USB connection 300, and system USB interface 10, as illustrated in FIG. 1. Controller 24 can also control and/or configure one or more logical units within converter 200. For example, controller 24 can exchange commands, data units, and/or status information with driver 14 via converter USB interface 20 which can control and/or configure the data flow and/or the execution of data within converter 200.

In certain embodiments, one or more buffers 25, 26 can be used to compensate for certain transfer problems, including, but not limited to, controller 24 performance problems, conversion problems between the various logic units within converter 200, and/or errors introduced by the failure of any or all of the various logic units within the converter 200. Buffers 25, 26 can vary in size, including, but not limited to, a size of zero.

Converter 200 may optionally include audio-video interface circuitry 28, which may comprise one or more audio and/or video encoders and/or decoders. Audio-video interface circuitry 28 thus provides various audio and/or video input and output capability. However, audio-video interface circuitry 28 constitutes no part of the present invention and will thus not be further described in detail. Components 21, 25, 24, 26, 23, 27, 28, and 29 of FIG. 2 may be implemented in discrete circuitry or, more preferably, as a custom ASIC.

According to certain embodiments, a discrete circuitry implementation of converter 200 may thus comprise the following chips: a) Agere FW323, b) Cypress EZ- USB FX2, and c) an Altera Cyclone EP1C3 Field Programmable Gate Array ("FPGA") chip. The Agere FW323 is a 1394A PCI Link/Phy Open Host Controller Interface ("OHCI") chip, commercially available from Agere Corporation of Allentown, Pa. The Cypress EZ-USB FX2 is a USB microcontroller chip with hi-speed USB interface and a general programmable interface ("GPIF") (CY7C68013), commercially available from Cypress Corporation of San Jose, Calif. The Altera Cyclone chip is a FPGA, comprised of 2910 logic elements, 104 I/O pins and 6.5 Kbyte of RAM. The functions of logical components 22, 23, and 26 (see, e.g., FIG. 2) may be performed by the FW323 chip. The functions of logical components 24 and 27 may be performed by the Altera Cyclone EP1 C3 FPGA. The functions of logical components 20, 21, 25, and 27 may be performed by the Cypress EZ-USB.

In general, the Agere chip handles all functions of the Physical and Link Layers as well as a sub-set of the Transaction Layer and Serial Bus Management, as defined in IEEE1394-1995. The Agere chip adheres to the 1394 Open Host Controller Interface Specification (OHCI, available from Intel™ Corporation).

In general, the Cypress chip performs the following functions. A built-in USB 2.0 transceiver converts data to and from electrical signaling levels in accordance with the USB specification. A built-in USB serial-interface engine handles the low-level packet structure, including handshaking and flow-control to and from system 100. A built-in 8051 microcontroller executes code stored in built-in SRAM memory. This code handles higher-level USB protocol elements and Altera Cyclone configuration data during the device discovery and initial configuration phase as received from system 100. A programmable peripheral interface facilitates bi-directional data transfers between system 100 and the Altera Cyclone chip.

In general, the Altera Cyclone chip provides an interface for bi-directional data transfer to the Cypress chip and also provides a bi-directional interface to the Agere FW323 chip. In addition, the Altera Cyclone chip has a built-in memory that is used to store and transfer data from one interface to the another. The Altera Cyclone chip functions to add or interpret information (e.g., headers) of an intermediate protocol when communicating with system 100. This functionality is provided by configuration data which is supplied by driver 14. Additional functionality, such as, for example, implementation of audio/video input and output capability of optional audio/video circuitry 28, can be supplied by downloading different configuration data from driver 14 to the Altera Cyclone chip.

A power supply 29 provides operating power to converter 200 and may be powered either from the USB bus entering converter USB interface 20, from an external AC/DC power supply, or other appropriate power source, as known to those skilled in the art.

According to certain embodiments, one or more commands can be sent by driver 14 to be executed by at least one logic unit within converter 200. For example, commands (e.g., interrupt and/or execution commands) packaged in USB protocol and sent from driver 14 can be received by controller 24 for immediate processing and/or for later retrieval. Commands can also be sent by at least one logic unit within converter 200 (e.g., controller 24) to system 100 for execution by one or more components within system 100 (e.g., driver 14 and/or application 12).

In certain embodiments, converter 200 can include one or more memory units 27. Memory unit 27 facilitates the collection of data units within converter 200. For example, memory unit 27 can store data units sent to controller 24 for use and/or delivery at a later time. In this way, memory unit 27 can facilitate efficacious data exchange through converter 200 by allowing data units to achieve various sizes. Memory unit 27 can also compensate for large data streams that may otherwise inundate controller 24 by collecting excess data units above any limit that controller 24 may be able to accept.

According to certain embodiments, as illustrated in FIGS. 1 and 2, data units from IEEE 1394 device 400 can be routed to converter IEEE 1394 interface 22 on converter 200. Although this text describes data flow from converter IEEE interface 22 to converter USB interface 20, the opposite flow of data units is contemplated in a substantially similar manner. Data units routed to IEEE 1394 interface 22 can adhere to the IEEE 1394 protocol. Each such data unit can arrive at PTU 23, where the data unit can be translated, converted, and/or modified to conform to a converter internal translation protocol. The converter internal translation protocol can act as an intermediary protocol to facilitate conversion of data units from the IEEE 1394 bus protocol to the USB bus protocol, or vice versa. For example, the converter internal translation protocol used between PTU 23 and controller 24 via optional buffer 26 in a discrete implementation based on the Agere FW323 chip may be the OHCI over local bus PCI protocol. More details of the OHCI over local bus PCI protocol may be found in, e.g., 1394 Open Host Controller Interface Specification, Release 1.1, Jan 2000 and PCI local bus specification, Rev. 2.3, March 2002.

Controller 24 can receive data units conforming to the internal translation protocol from PTU 23, via optional buffer 26, and can optionally add a header to one or more of the data units if necessary to facilitate conformation of the data units to the USB bus protocol. Each data unit, or a collection of data units in a data packet, can be received by PTU 21 via optional buffer 25. PTU 21 can translate, convert and/or modify each data unit or collection of data units to conform to the USB bus protocol.

In certain embodiments, one or more data units can be stored within controller 24 and/or optional memory unit 27 for later retrieval and/or collection of multiple data units into data packets. The data packet size can be predetermined and hard coded in controller 24 and/or can be controlled by driver 14 sending a corresponding command packet to controller 24. When the data packet reaches the predetermined size and/or when controller 24 receives an appropriate command packet, one or more data packets, including optional headers, can be sent along toward converter USB interface 20, via PTU 21 and optional buffer 25.

Figure 3:
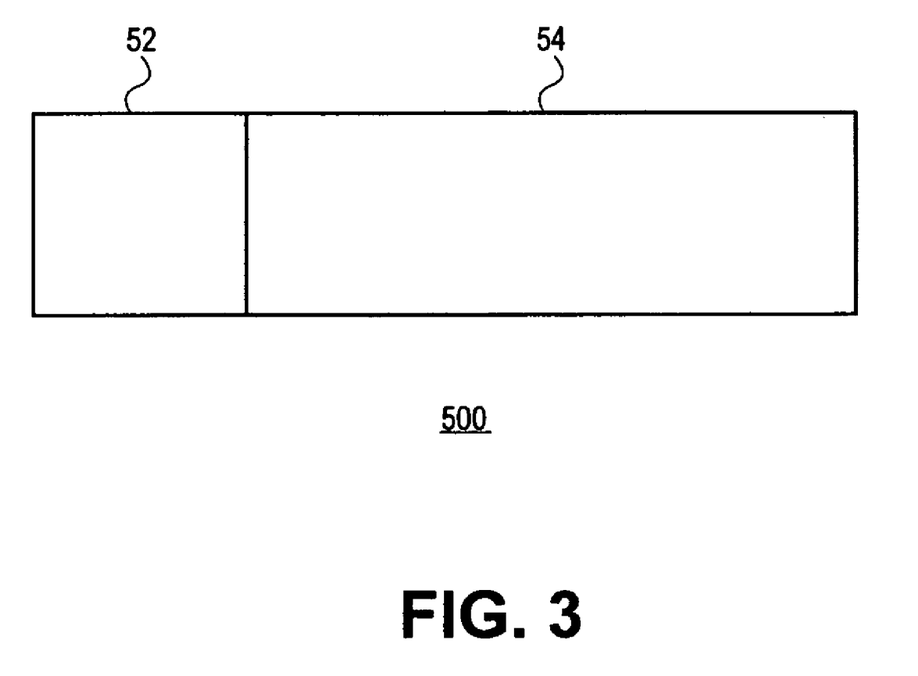
FIG. 3 illustrates an exemplary diagram of a data packet.

In certain embodiments, as illustrated in FIG. 3, data 500 transferred via USB connection 300 can comprise a fixed or variable-sized data packet 54 along with an optional header 52, as set forth in more detail in, e.g., the Universal Serial Bus Specification Revision 2.0, dated Apr. 27, 2000. Header 52 can describe the data packet type such as, for example, command, status information, or transfer data. Header 52 can also describe the size of data packet 54. In addition, header 52 can contain a tag field to uniquely identify a particular data packet 54. Also, header 52 can contain an identifier field to identify the header 52 itself and/or a size field to describe the size of header 52.

In certain embodiments, driver 14 (FIG. 1) can directly or indirectly receive data units and/or data packets from converter 200 via converter USB interface 20 and system USB interface 10. Driver 14 can then process received data packets based upon the contents of optional header 52 (see FIG. 3). Driver 14 can also identify and/or process data packets based on the contents of each data packet. Data units and/or data packets can be delivered directly or indirectly to application 12 (see FIG. 1). For example, a camcorder can stream video data in real-time via converter 200 to application 12.

According to certain embodiments, as illustrated in FIGS. 1 and 2, data can be directly or indirectly sent by driver 14 to converter 200 via USB connection 300 and converter USB interface 20 in the form of data units and/or data packets as specified in, e.g., the Universal Serial Bus Specification Revision 2.0, dated Apr. 27, 2000. Before driver 14 sends one or more data packets, driver 14 can add an optional header to any data packet, and/or driver 14 can modify one or more data units within each data packet. Each such data unit can arrive at PTU 21, where the data unit can be translated, converted, and/or modified to conform to a converter internal translation protocol such as the OHCI over local PCI bus protocol. The converter internal translation protocol can act as an intermediary protocol to facilitate conversion of data units from the USB bus protocol to the IEEE 1394 bus protocol, or vice versa.

According to certain embodiments, controller 24 can receive data conforming to the internal translation protocol from PTU 21, via optional buffer 25, and can process one or more data packets based on the data type information contained in the optional header. Controller can process one or more data packets based on the contents of each data packet. If, for example, a data packet contains a command packet, the command can be executed or stored in controller 24 and/or optional memory unit 27 for later execution. Also, for example, if a data packet contains a transfer data packet, the header, if present, can be removed and the data packet can be sent out via optional buffer 26 and PTU 23 to converter IEEE 1394 interface 22. Each data unit, or a collection of data units in a data packet, can be received by PTU 23 via optional buffer 26. PTU 23 can translate, convert and/or modify each data unit or collection of data units to conform to the IEEE 1394 bus protocol. Optionally, one or more data packets can be stored in controller 24 and/or memory unit 27 for later transmission by driver 14 and/or controller 24 to converter IEEE 1394 interface 22. All data transfers can be accomplished full duplex, for example, all data input and output can work fully parallel.

Figure 4:
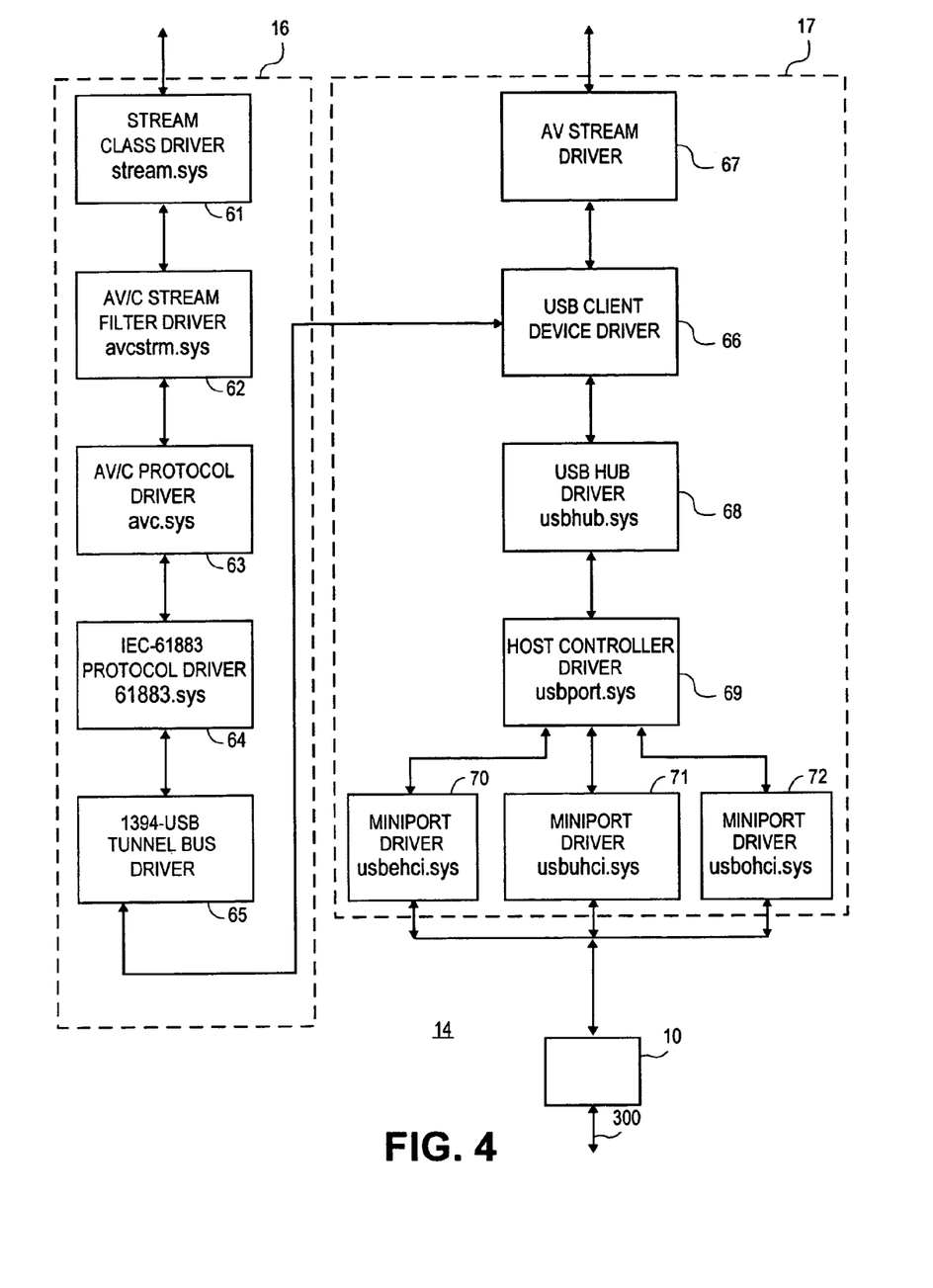
FIG. 4 illustrates an exemplary diagram of a driver.

Driver 14 is shown in greater detail in FIG. 4. As shown in FIG. 4, driver 14 can comprise a 1394-USB tunnel bus driver component 65 and a USB client device driver component 66. Driver 14 also comprises software components 61 through 64 and 68 through 72, which are, respectively, IEEE 1394 driver stack components and USB driver stack components of Microsoft™ Windows XP™ and are known in the art. Components 61-64 and 65 form a 1394 driver stack 16. Component 61 is the stream class driver "stream.sys," component 62 is the AV/C stream filter driver "avcstrm.sys," component 63 is the AV/C protocol driver "avc.sys," and component 64 is the IEC-61883 protocol driver "61883.sys." Components 66 and 67-72 form a USB driver stack 17. Component 67 is an AV stream driver, component 68 is the USB Hub driver "usbhub.sys," component 69 is the Host Controller Driver "usbport.sys," component 70 is the miniport driver "usbehci.sys," component 71 is the miniport driver "usbuhci.sys," and component 72 is the miniport driver "usbohci.sys." Standard USB commands and data packets, created by components of system 100 other than application 12, are received by component 67 and pass transparently through component 66 and on to USB connection 300 in a normal manner.

Component 65 interfaces to component 64 via the IOCTL_1394_CLASS interface described in the Windows™ Driver Development Kit ("DDK"), available from Microsoft™ Corporation. Component 65 implements all IEEE1394 BUS I/O requests as defined in the Microsoft™

DDK. Thus, components 61-64 operate as if communicating with a standard Microsoft™ OHCI PCI 1394 bus driver and a Microsoft™ 1394 port driver instead of accessing component 65. When component 65 receives an IEEE1394 BUS I/O request from component 64, it handles this request by exchanging appropriate data packets, commands and/or status messages with converter 200 via component 66 by using callback functions and/or IOCTLs. As an example, data packets with OHCI compatible PCI accesses are created. These data packets are defined in the 1394 Open Host Controller Interface Specification, Release 1.1 and a converter packet format specification, attached as an Appendix. A more detailed example will be given later on in this document.

In certain embodiments, component 66 can be a streaming class USB minidriver constructed according to the Windows™ Driver Model, as described in the Microsoft™ DDK documentation. This driver can facilitate all data transfer to and from converter 200 via USB. For example, it can pass data packets and/or commands from 1394-USB tunnel bus driver component 65 via components 68-72 and system USB interface 10 to converter 200 and vice versa. USB client device driver component 66 can interface to component 68 by using I/O requests for USB client drivers, as defined in the Microsoft™ DDK. Additional details of data formats and protocols executed by driver 14 and system USB interface 10 are set forth in Converter Configuration and Transmission format, attached as an Appendix.

An operational example of certain embodiments follows. When connecting converter 200 to system 100 (FIG. 1), the Microsoft™ Windows™ Plug&Play mechanism of operating system 11 detects that converter 200 has been connected to system 100 and system USB interface 10, loads USB driver stack 17 into system memory, and starts execution of these components. USB driver component 66 sends an IOCTL command to tunnel bus driver component 65 (tunnel bus driver component 65 is started, e.g., during system startup) and establishes a callback interface by exchanging function pointers between tunnel bus driver component 65 and USB driver component 66. As a result, tunnel bus driver component 65 becomes aware that USB driver component 66 is available and initializes components 20-27 on converter 200 (see, e.g., FIG. 2) by sending appropriate data packets and/or commands to converter 200.

When IEEE device 400 is connected to converter 200, PTU 23 (FIG. 2) generates SelfID packets (see, e.g., the OHCI specification) which can be stored into memory unit 27. Controller 24 now packs these SelfID packets into data packets. These data packets are sent from controller 24 to tunnel bus driver component 65 via USB driver component 66. Tunnel bus driver component 65 initiates the system's device detection mechanism as specified in the DDK and, as a result, IEEE 1394 device 400 is detected by the system's Plug&Play manager. Operating system 11 then loads components 61-64, initiates communication via tunnel bus driver component 65, and enables communication with IEEE 1394 device 400.

A detailed explanation of an operation consistent with the present invention will now be described. Assume that it is desired for system 100 (FIG. 1) to receive IEEE 1394 format digital video data from IEEE 1394 device 400 (e.g., a camcorder) and to process this data with a digital video application 12 in system 100. First, a connection is made between converter 200 and system 100 using, for example, a standard USB 2.0 cable. Next, a connection is made between device 400 and converter 200 using, for example, a standard IEEE 1394 cable. Execution of application 12 is then initiated in system 100. Application 12 initiates output of data from IEEE device 400 by sending, for example, a FCP/AVC command via driver 14 and converter 200 to device 400, as discussed in more detail in the following paragraph. FCP/AVC commands are known in the art and are defined in the Specification AV/C Digital Interface Command Set Rev. 2.0, 1394 Trade Association.

According to certain embodiments, sending the FCP/AVC command from application 12 to IEEE 1394 device 400 via converter 200 will now be described. Application 12 creates, for example, a FCP/AVC command and sends the FCP/AVC command via components 61 through 64 (FIG. 4) to 1394-USB tunnel bus driver component ("tunnel bus driver") 65. Components 63 and 64 break the FCP/AVC command into multiple 1394 asynchronous write and 1394 asynchronous read commands and send these commands to tunnel bus driver component 65. IEEE 1394 asynchronous and isochronous read and write commands are known in the art. Tunnel bus driver component 65 now receives certain commands, for example, one asynchronous write command, and executes the commands as described by an exemplary embodiment in the following paragraphs.

Tunnel bus driver component 65 generates a 1394 data packet that includes the asynchronous command received from component 64 and adds a "store in RAM" header to this 1394 data packet. Tunnel bus driver component 65 then generates an OHCI OUTPUT_MORE descriptor in system memory 13 that points to the 1394 data packet, and adds a "store in RAM" header to this descriptor. Next, tunnel bus driver component 65 generates an update of the previous OUTPUT_MORE descriptor (that is currently in use by converter IEEE 1394 interface 22), adds a link to the newly generated OUTPUT MORE descriptor, and adds a "store in RAM" header to this updated descriptor. Optionally, if no OUTPUT_MORE descriptor is currently in use by IEEE 1394 interface 22, tunnel bus driver component 65 generates a "PCI Write DWORD" command to write to OHCI CommandPtr register in interface 22, and generates a "PCI Write DWORD" command to a write OHCI ContextControl register with parameter "run" in IEEE 1394 interface 22 to start execution of a descriptor list.

All of these data packets are sent in the given order via USB connection 300 to converter 200 as follows. Tunnel bus driver component 65 sends these data packets to USB client device driver component 66 which, in turn, sends the data packets to the currently active USB miniport driver (i.e., usbehci.sys 70, usbuhci.sys 71, or usbohci.sys 72). The currently active USB miniport driver converts the data packets bitwise into electrical pulses along USB connection 300 in accordance with the appropriate USB specification. This conversion can include, for example, additional markers to indicate the start and end of one or more data packets and/or checksums to facilitate error detection.

Converter USB interface 20 (FIG. 2) decodes the electrical pulses sent via USB connection 300 into a binary representation in accordance with the appropriate USB specification. PTU 21 then reconstructs and verifies the data packets from the stream of data it received from converter USB interface 20. PTU 21 stores the data packets in buffer 25 in accordance with the converter internal translation protocol used with PTU 21.

Controller 24 monitors the amount of data stored in buffer 25 and retrieves header 52 from data packet 500 when header 52 becomes available. After this retrieval, controller 24 analyzes the contents of header 52 and, if appropriate, controller 24 executes the command contained within header 52. For example, if header 52 contains a "store in RAM" command, controller 24 stores the data units from data packet 500 that immediately follow header 52 in memory unit 27. Other examples of commands that may be executed by controller 24 include fetching additional data units from buffer 25, reading a register of IEEE 1394 interface 22 (i.e., PCI read DWORD), and/or writing a register of IEEE 1394 interface 22 (i.e., PCI write DWORD). Controller 24, then, writes the command parameter contained in header 52 into the corresponding OHCI register of IEEE 1394 interface 22. This, in turn, triggers IEEE 1394 interface 22 to fetch a new descriptor list by asking controller 24 for a memory location, which, in turn, retrieves data from memory unit 27. Based on this new descriptor list, IEEE 1394 interface 22 fetches data from controller 24 and converts it bitwise into electrical pulses in accordance with the IEEE 1394 specification. IEEE 1394 interface 22 then sends these electrical pulses along the IEEE 1394 connection between IEEE 1394 interface 22 and device IEEE 1394 interface 40.

IEEE 1394 device 400 acknowledges the reception and execution of the asynchronous write command by sending an acknowledge packet via the IEEE 1394 connection to converter IEEE 1394 interface 22. IEEE 1394 interface 22 retrieves this acknowledge packet and asks controller 24 to write data which reflects this acknowledgement to memory unit 27. When buffer 25 can accommodate additional capacity, controller 24 adds a header 52 to buffer 25 and fetches data units 54 from memory unit 27, thereby generating another data unit in internal translation protocol for use with PTU 21. PTU 21 then sends data from buffer 25 to converter USB interface 20, which converts the data bitwise into electrical pulses in USB format for transmission across USB connection 300 to system USB interface 10.

USB driver stack 17 decodes the received electrical pulses to binary form using the appropriate USB miniport driver ("minidriver") (e.g., usbehci.sys 70, usbuhci.sys 71, or usbohci.sys 72). The appropriate minidriver is chosen by the Windows™ XP™ operating system according to the type of system USB interface 10. For example, if system USB interface 10 adheres to the Enhanced Host Controller Interface Specification for Universal Serial Bus (EHCI, available from Intel™ Corp.), minidriver 70 will be used. In another example, if system USB interface 10 adheres to the Universal Host Controller Interface Specification for USB (UHCI, available from Intel™ Corp.), minidriver 71 will be used. In yet another example, if system USB interface 10 adheres to the Open Host Controller Interface Specification for USB (OHCI, originally available from Compaq™), minidriver 72 will be used.

Data is now sent along components 69, 68, and USB client device driver component 66 to tunnel bus driver component 65, which sends an appropriate status message based on the received data packet to component 64.

Starting an isochronous stream of data (e.g., 1394 video data transfer) involves exchanging multiple asynchronous write and read commands between IEEE 1394 device 400 and tunnel bus driver component 65, as described above. Streaming of isochronous data is accomplished similar to the above described procedure for asynchronous data transfer.

According to certain embodiments, converter 200 can process data from system 100 and/or IEEE 1394 device 400 directly. For example, converter 200 can generate responses to certain incoming data and can send these responses as, for example, status information packets and/or data packets via converter IEEE 1394 interface or converter USB interface, or both. Controller 24 can process events, for example interrupts, from various components within converter 200 and can, as a result, configure certain components within converter 200 and/or send appropriate data via converter IEEE 1394 interface or converter USB interface, or both. Further details of format and protocol are set forth in the attached Appendix.

Computer instructions forming 1394-USB tunnel bus driver component 65 and USB client device driver 66 can be stored on a computer-readable medium, such as a CD-ROM, along with program installation code. The computer-readable medium may be inserted into a CD drive of a computer system operating under an operating system, such as Windows XP, and also including an application 12 such as Pinnacle Systems Studio. In a manner well-known to those skilled in the art, the installation code may be activated by a user to cause components 65 and 66 to be stored on a storage medium of the system, such as a hard drive. In an alternative embodiment, application 12 may not initially reside on the system. Computer instructions forming application 12 may be included on the computer-readable medium along with instructions forming components 65 and 66 and the installation code. When the computer-readable medium is inserted into a CD drive of the system, the user may activate the installation code to load application 12 in executable form onto the storage medium, along with components 65 and 66.

Application 12 may then be launched, causing components 65 and 66 to be installed into working memory of the system and interfaced with driver stacks of the operating system to permit operation of the methods described above.

Although functions have been described above as being implemented by specific components, those skilled in the art will understand that such specificity is not required in order to implement embodiments consistent with the invention. Thus certain functions described as being performed in, for example, component 14 could be performed by component 10, and vice-versa.

In the foregoing specification, the invention has been described with reference to specific exemplary implementations. It will, however, be evident that various modifications and changes may be made thereto without departing from the broader spirit and scope of the invention as set forth in the appended claims. The specification and drawings are, accordingly, to be regarded in an illustrative, rather than a restrictive, sense.

What is claimed is:

1. A method for transferring data between a video application, executing in a computer system, and a digital video device, comprising:
    generating an IEEE 1394 command to exchange data with a digital video device, the IEEE 1394 command being generated in the video application according to IEEE 1394 protocol;
    converting, in the computer system, the IEEE 1394 command to a USB command in accordance with the USB protocol;
    transmitting the USB command over a USB connection in the computer system to a converter device external to the computer system;
    receiving the USB command in the converter device;
    converting, in the converter device, the USB command to the IEEE 1394 command; and
    transmitting the IEEE 1394 command from the converter device to the digital video device.

2. The method as recited in claim 1, wherein converting the IEEE 1394 command to the USB command comprises a 1394-USB tunnel driver that receives a IEEE 1394 bus input-output request, creates data packets with OHCI-compatible PCI accesses and transmits them to a USB stack.

3. The method as recited in claim 1, wherein converting the IEEE 1394 command to the USB command comprises, a USB client device driver that receives data packets from a IEEE 1394 stack, passes data packets to a system driver component, and transmits them to the converter device.

4. The method as recited in claim 1, wherein converting the IEEE 1394 command to the USB command, in the computer system, comprises first converting the IEEE 1394 command to an intermediate protocol.

5. A method for transferring data between a video application, executing in a computer system, and a digital video device, comprising:

generating an IEEE 1394 command to exchange data with the video application running on the computer system, the IEEE 1394 command being generated in the digital video device according to IEEE 1394 protocol;

transmitting the IEEE 1394 command over a IEEE 1394 connection to a converter device;

receiving the IEEE 1394 command in the converter device;

converting, in the converter device, the IEEE 1394 command to a USB command in accordance with the USB protocol;

transmitting the USB command over a USB connection from the converter device to the computer system;

receiving the USB command in the computer system; converting, in the computer system, the USB command to a IEEE-1394 command in accordance with the IEEE-1394 protocol; and     providing the IEEE-1394 to the video application.

6. The method as recited in claim 5, wherein converting the USB command to the IEEE-1394 command in the computer system comprises first converting the IEEE 1394 command to an intermediate protocol.

\* \* \* \* \*